United States Patent
Phillips

[11] 3,962,876
[45] June 15, 1976

[54] FISHWAY

[75] Inventor: Adrian Phillips, Toronto, Canada

[73] Assignee: Aeroceanics Fishways Corporation, Scarborough, Canada

[22] Filed: July 15, 1974

[21] Appl. No.: 488,380

[30] Foreign Application Priority Data
Oct. 6, 1973 United Kingdom............... 46773/73

[52] U.S. Cl. .................................................. 61/21
[51] Int. Cl.$^2$ .......................................... E02B 8/08
[58] Field of Search ....................... 61/21; 119/2, 3; 43/100

[56] References Cited
UNITED STATES PATENTS

| | | | |
|---|---|---|---|
| 132,349 | 10/1872 | Brackett ................................. | 61/21 |
| 1,730,005 | 10/1929 | Grether.................................. | 61/21 |
| 2,978,873 | 4/1961 | Wardle ................................... | 61/21 |
| 3,038,314 | 6/1962 | Hultman................................. | 61/21 |

OTHER PUBLICATIONS
"Fishways" from Bulletin of the Bureau of Fisheries, vol. XXVIII, 1908, pp. 1045–1047, 1050.
"New Experimental Fishway," Engineering News Record, Mar. 29, 1956, p. 44.

*Primary Examiner*—Robert L. Wolfe
*Assistant Examiner*—David H. Corbin
*Attorney, Agent, or Firm*—Arne I. Fors

[57] ABSTRACT

A fishway comprising a channel having spaced-apart side walls and an interconnecting bottom wall for conducting a flow of water therethrough, a plurality of longitudinally spaced vortex generators formed on each channel side wall for providing reversing vortices in the flow stream of water along the channel whereby alternately reversing cross-stream water flows and upstream water flows are created to assist fish using the fishway in upstream travel. The vortex generators are provided by uniformly spaced baffles extending alternately from the channel side walls. The channel can be straight or curved in the form, for example, of a helix.

9 Claims, 4 Drawing Figures

FISHWAY

BACKGROUND OF THE INVENTION

This invention relates to fishways and, more particularly, relates to fishways for bridging obstacles such as dams and waterfalls by incorporating vortex generators in flumes or the like flow channels.

The several types of fishways in use today may be generally categorized as follows:
1. Weir type in which weirs or baffles separate a series of progressively elevated pools over which fish ascend by either swimming or jumping over each weir between adjacent pools;
2. Orifice type in which orifices are formed at the base of baffles or weirs through which the fish can pass. Fish may also swim or jump over the top of the weirs or baffles;
3. The Denil type, known for about 50 years, is basically a straight sloping channel with obstruction vanes fitted to both the sides and bottom causing part of the water to turn back on itself, thereby reducing the water velocity. This apparatus creates considerable localized turbulence, however, posing difficulties for some fish to traverse; and
4. Vertical Slot type, also called the Hell's Gate type, which is an adaption of the orifice type, but with vertical slots extending from the top to the bottom of the weirs or baffles.

The foregoing types of fishways require that the fish, either jumping or swimming through orifices or through slots, must swim against the current in order to proceed upstream. Many fish cannot overcome high current velocities over extended flow runs and thus fail to navigate the fishways.

SUMMARY OF THE INVENTION

I have found that the foregoing disadvantages of known fishways can be substantially overcome by a channel having spaced-apart side walls and an interconnecting bottom wall for conducting a flow of water therethrough, a plurality of longitudinally spaced vortex generators formed on each channel side wall for providing reversing vortices in the flow stream of water along the channel whereby alternately reversing crossstream water flows and upstream water flows are created to assist fish using the fishway in upstream travel. It is thus a principal object of the present invention to avoid the necessity of fish swimming directly upstream against water current by the creation of a series of interconnected reversing vortices by vortex generators which reverse their direction of rotation at each adjacent vortex generator. Each vortex has downstream, upstream and crossflow components which are controlled to not only allow the fish to benefit from the upstream flow path of each vortex but also to minimize the downstream flow component to enable the fish to use the crossflows of water extending alternately from one side of the channel to the other to assist the fish in propelling itself upstream.

It is another object of the invention to provide a structurally simple self-supporting fishway apparatus which can be readily adapted to suit installation needs and assembled in situ occupying minimum space requirements.

And another object of the invention is the provision of a fishway which is self-regulatory in maintaining a constant and uniform flow of water along its length.

BRIEF DESCRIPTION OF THE DRAWINGS

These and other objects of the invention and the manner in which they can be attained will become apparent from the following description of the drawings, in which.

Figure 1:
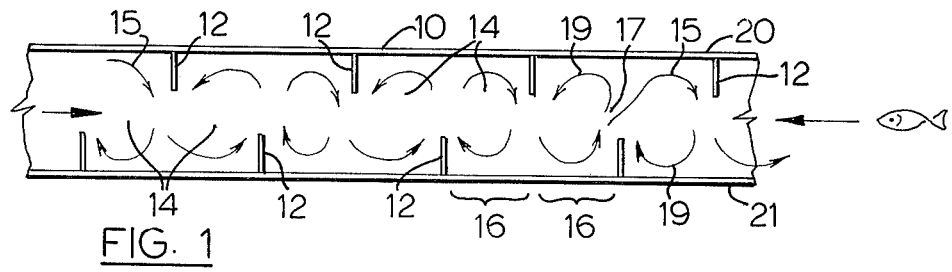
FIG. 1 is a plan view of a straight-flow channel embodiment of the present invention incorporating the vortex generators.
Figure 2:
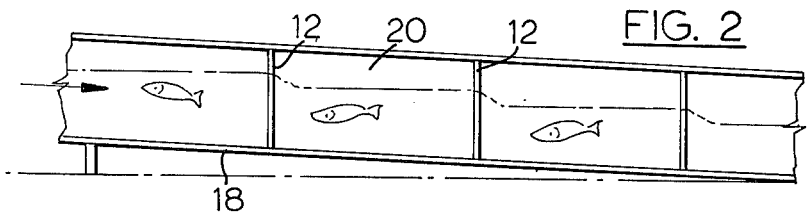
FIG. 2 is a longitudinal vertical section of the channel shown in FIG. 1.

With reference now to the embodiment depicted in FIGS. 1 and 2, the straight-flow channel 10 is illustrated to have uniformly staggered baffles 12 attached to each side of the channel to create a series of vortex generators by interaction with the flow of water therethrough to create a multiplicity of reversing vortices 14 along the length of the channel 10, each vortex 14 alternating in direction of rotation at each step, as indicated by numerals 16. Each vortex comprises a downstream component 15, a crossflow component 17 and an upstream component 19.

Channel 10 comprises an elongated U-shaped flume formed of, for example, sheet steel or glass fibre having glass fibre or metal baffles 12 secured to the sides thereof, as depicted in FIG. 2, to extend from the channel bottom wall 18 preferably to the top of the side walls 20,21. It is critical for the successful operation of this invention that the crossflow, i.e. lateral flow, component 17 as compared to the downstream flow component 15, be sufficiently large that the fish can overcome the downstream velocity by swimming across the lateral stream flows. The upstream component 19 of each vortex permits fish to rest during travel through the fishway, in addition to assisting the fish in their upstream travel.

I have found that a gradient within the range of from about 1:10 to about 1:15, preferably about 1:12, with vortex generators provided by baffles 12 extending across the channels alternately from their respective channel side walls about one-quarter to about one-half the channel width, preferably about one-third the channel width, and having a longitudinal spacing from each other on opposite sides of about equal to the channel width, provides satisfactory crossflow, downstream and upstream flow velocities to permit fish to safely traverse the fishway.

Figure 3:
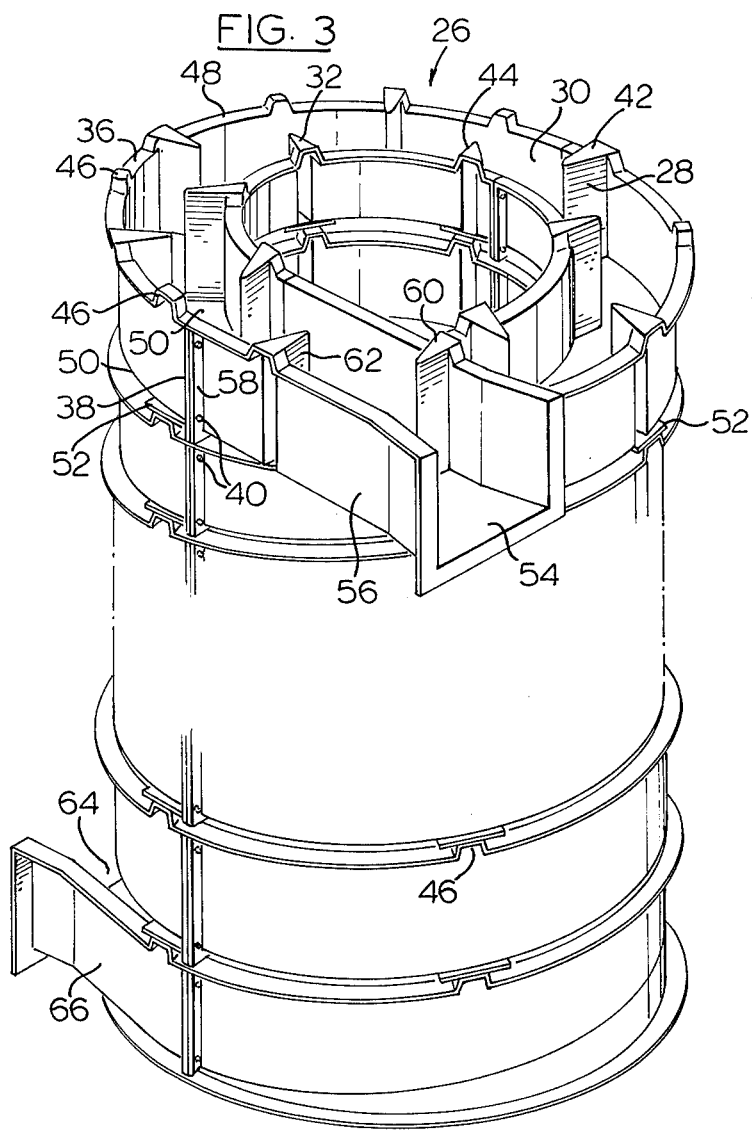
FIG. 3 is a perspective view of a circular channel helical embodiment of the present invention incorporating the vortex generators.
Figure 4:
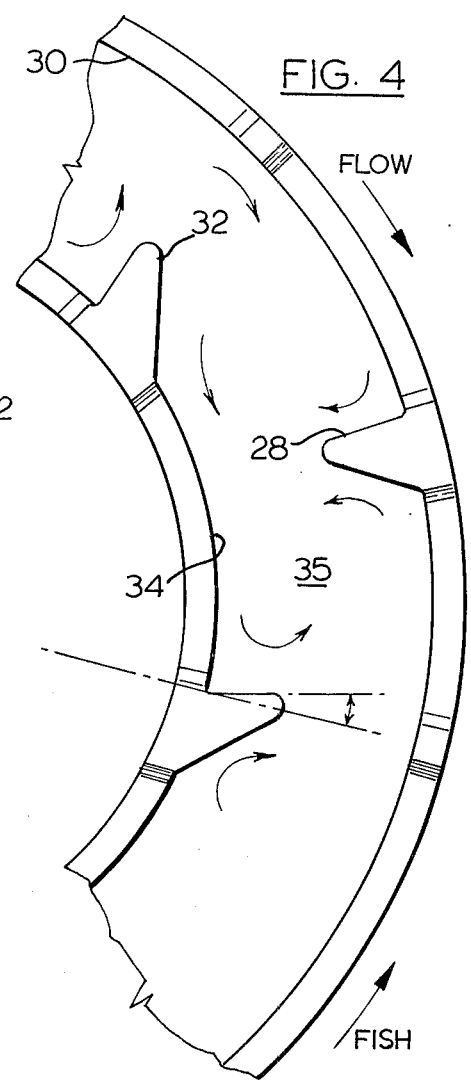
FIG. 4 is an enlarged plan view of a section of the channel shown in FIG. 3.

The fishway channel can be straight, as described above, or can be curved to clear obstructions. FIGS. 3 and 4 illustrate a second embodiment of my fishway in which the channel 26 is arranged in a circular path to form a helix having, for example, six convolutions. Baffles 28 formed or secured to the outer wall 30 of the fishway are substantially radially disposed and baffles 32 secured to the inner wall 34 of the fishway preferably are angularly inclined upstream about 10° to the radius of the helix circle. A series of reversing vortices 35, as depicted more clearly in FIG. 4, are formed by interaction of the downstream flow of water with baffles 28,32 and function, as described hereinabove with reference to the straight-flow channel, with the same structural characteristics of flow gradient, i.e. within the range of from about 1:10 to about 1:15, baffle width of about one-quarter to about one-half of channel width, preferably about one-third of channel width, and baffle longitudinal spacing about equal also to channel width, to assist fish to travel upstream against a descending flow of water.

The embodiment of my invention illustrated in FIGS. 3 and 4 consists of a plurality of semi-circular annular channel sections 36 formed or moulded glass fibre-reinforced polyester resin joined together at flanges 38 by bolts or the like connectors 40 to define the helical channel 26. Outer baffles 28 and inner baffles 32 are formed as shown to have elevated upper extensions 42,44 respectively which, with intermediate elevated spacers 46 formed on upper flange 48 of outer wall 30, support the bottom wall 50 of the channel sections. Bearing plates 52 disposed between extension 42,44 and the abutting bottom wall 50, distribute the weight of the channel sections and contained water from one channel level to the next.

The water inlet 54, provided by straight section 56, is substantially tangential to the semi-circular channel sections. Section 56 is secured to the first semi-circular channel section by bolts 40 through flange 58 and abutting flange 38. Section 56 has inner and outer baffles 60,62.

Water outlet 64 is provided by straight section 66 having a similar construction to section 56 but reversed to accommodate the rotation of the helical channel.

The apparatus of the present invention provides a number of important advantages. Fishways providing facile and reliable travel of fish across stream obstacles can be readily designed and adapted to various terrains. The fishway can be prefabricated of straight or helical flow configurations suitable for quick assembly in place.

I claim:

1. A fishway comprising a channel having spaced-apart side walls and an interconnecting bottom wall for conducting a flow of water therethrough, a plurality of vortex generators formed alternately on the channel side walls a longitudinal distance apart about equal to the channel width by baffles extending from the channel side walls across the channel about one-quarter to about one-half the channel width for providing interconnected reversing vortices in the flow stream of water along the channel, said vortices extending substantially across the channel width, whereby alternately reversing cross-stream water flows and upstream water flows are created, with a minimized downstream flow, to assist fish in upstream travel by use of the said cross-stream and upstream water flows.

2. A fishway as claimed in claim 1 in which said channel has a flow gradient in the range of from about 1:10 to about 1:15.

3. A fishway as claimed in claim 1 in which said channel has a flow gradient of about 1:12.

4. A fishway as claimed in claim 2 in which said vortex generators are formed by baffles extending alternatively from the channel side walls across the channel about one-third the channel width.

5. A fishway as claimed in claim 2 in which said baffles alternate from the channel side walls across the channel about one-third the channel width and are spaced longitudinally from each other on opposite sides about equal to the channel width.

6. A fishway as claimed in claim 1 in which said channel is straight.

7. A fishway as claimed in claim 1 in which said channel forms a helix.

8. A fishway as claimed in claim 7 in which baffles formed on the outer helix wall are substantially radial to the helix circle and baffles formed on the inner helix wall are angularly inclined upstream about 10° to the radius of the helix circle.

9. A fishway as claimed in claim 8 comprising channel side walls and bottom walls formed of a rigid material in semi-circular helical components, means for rigidly connecting said components together in watertight relation, means formed on each said component for vertically supporting adjacent upper and lower components, and substantially straight water inlet and outlet components connected to the uppermost and lowermost helical components respectively for permitting fish egress from and ingress to the fishway.

* * * * *